(12) United States Patent
Suwabe

(10) Patent No.: US 11,048,989 B2
(45) Date of Patent: Jun. 29, 2021

(54) IMAGE FORMING APPARATUS THAT ACCEPTS A DESIGNATION OF AN INSERTION POSITION OF AN INSERTION SHEET AFTER OBTAINING IMAGE DATA OF A BUNDLE OF SHEETS, AND RELATED CONTROL METHOD AND STORAGE MEDIUM

(71) Applicant: CANON KABUSHIKI KAISHA, Tokyo (JP)

(72) Inventor: Takeshi Suwabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/140,271

(22) Filed: Apr. 27, 2016

(65) Prior Publication Data

US 2016/0350633 A1 Dec. 1, 2016

(30) Foreign Application Priority Data

May 25, 2015 (JP) .............................. JP2015-105821

(51) Int. Cl.
*G06F 3/12* (2006.01)
*G06K 15/00* (2006.01)
(Continued)

(52) U.S. Cl.
CPC ........... *G06K 15/404* (2013.01); *B65H 33/00* (2013.01); *B65H 43/06* (2013.01); *G03G 15/502* (2013.01);
(Continued)

(58) Field of Classification Search
None
See application file for complete search history.

(56) References Cited

U.S. PATENT DOCUMENTS 7,760,380 B2 7/2010 Suwabe
8,472,051 B2 6/2013 Sakiyama et al.
(Continued)

FOREIGN PATENT DOCUMENTS

CN 101290492 A 10/2008
CN 101742035 A 6/2010
(Continued)

OTHER PUBLICATIONS

European Search Report dated Oct. 14, 2016 issued in corresponding European Patent Application No. 16166992.4.
(Continued)

*Primary Examiner* — Dov Popovici
(74) *Attorney, Agent, or Firm* — Venable LLP

(57) ABSTRACT

An image forming apparatus includes a display, and a scanner that reads one or more originals to obtain image data of the originals and a number of the originals. A memory device stores a set of instructions, and at least one processor executes the instructions to, among other things, display a first screen including an item for accepting a designation, by a user, of an insertion position of an insertion sheet. If a designation for insertion of the insertion sheet is made, the item includes an initial value of the insertion position that is determined based on the number of the originals that have been read by the reader. The at least one processor also executes the instructions to display a second screen including information related to the insertion sheet in accordance with receiving the designation by the user via the first screen.

7 Claims, 11 Drawing Sheets

(51) Int. Cl.
*H04N 1/00* (2006.01)
*B65H 33/00* (2006.01)
*B65H 43/06* (2006.01)
*G03G 15/00* (2006.01)
*G06K 15/02* (2006.01)

(52) U.S. Cl.
CPC .......... *G06F 3/1204* (2013.01); *G06F 3/1205* (2013.01); *G06F 3/1208* (2013.01); *G06F 3/1253* (2013.01); *G06F 3/1256* (2013.01); *G06F 3/1264* (2013.01); *G06F 3/1285* (2013.01); *G06K 15/02* (2013.01); *H04N 1/00408* (2013.01); *H04N 1/00411* (2013.01); *H04N 1/00424* (2013.01); *H04N 1/00466* (2013.01); *H04N 1/00472* (2013.01); *H04N 1/00474* (2013.01); *H04N 1/00482* (2013.01); *H04N 1/00639* (2013.01); *H04N 1/00795* (2013.01); *H04N 1/00957* (2013.01); *G03G 15/5016* (2013.01); *G03G 2215/00894* (2013.01); *G06K 15/1889* (2013.01); *H04N 2201/0094* (2013.01); *H04N 2201/3216* (2013.01); *H04N 2201/3273* (2013.01)

(56) References Cited

U.S. PATENT DOCUMENTS

| | | |
|---|---|---|
| 8,477,352 B2 | 7/2013 | Suwabe |
| 8,693,026 B2 | 4/2014 | Takahashi |
| 8,797,564 B2 | 8/2014 | Suwabe |
| 8,947,683 B2 | 2/2015 | Tominaga |
| 2002/0048044 A1 | 4/2002 | Kida |
| 2006/0028678 A1 | 2/2006 | Negeshi et al. |
| 2008/0259389 A1 | 10/2008 | Takahashi |
| 2009/0230606 A1 | 9/2009 | Yokomizo |
| 2010/0118338 A1 | 5/2010 | Sakiyama |
| 2010/0309524 A1 | 12/2010 | Suwabe |
| 2011/0228340 A1 | 9/2011 | Farrell et al. |
| 2013/0214477 A1 | 8/2013 | Kamata |
| 2013/0286436 A1 | 10/2013 | Inui |
| 2014/0029057 A1 | 1/2014 | Sato |

FOREIGN PATENT DOCUMENTS

| | | |
|---|---|---|
| JP | 2000-35729 A | 2/2000 |
| JP | 2002-204323 A | 7/2002 |
| JP | 2005-005750 A | 1/2005 |
| JP | 2006-184594 A | 7/2006 |
| JP | 2009-214406 A | 9/2009 |
| JP | 2010-134510 A | 6/2010 |
| JP | 2011-009980 A | 1/2011 |
| JP | 2014-019579 A | 2/2014 |
| JP | 2014-027604 A | 2/2014 |
| JP | 2014-229269 A | 12/2014 |

OTHER PUBLICATIONS

Office Action dated Sep. 13, 2018, issued in Chinese Patent Application No. 201610338379.6.

FIG. 10

<ADD>
SET DETAILS OF INSERT SHEET TO BE ADDED/EDITED

- PAGE NUMBER AT WHICH TO INSERT
  - ☐ PAGE NUMBER
  - [ 9 ] ~701
  - (1~30000)

702 — INTER LEAF

706 — INDEX SHEET

- SETTING OF INSERT LEAF (NUMBER OF SHEETS TO INSERT)
  - ☐ [ 1 ] ~703
  - (1~100)

- SHEET SELECTION 704
  - CASSETTE 2 A4
  - CHANGE

- PRINT SETTINGS 705
  - DO NOT PRINT
  - PRINT ON FRONT
  - PRINT ON BACK
  - PRINT ON BOTH FACES

CANCEL ~707    708~ OK

FIG. 11

READING UNDERWAY

INSERT SHEET SETTING

INTER LEAF | CHAPTER SHEET | INDEX SHEET     801  1101

| No. | SHEET | CASSETTE | INSERT POSITION | NUMBER OF SHEETS |
|---|---|---|---|---|
| 1 | INTER LEAF | CASSETTE 2 A4 | BEFORE 5TH PAGE | 1 |
| 2 | INTER LEAF | CASSETTE 2 A4 | BEFORE 9TH PAGE | 1 |
| 3 | | | | |
| 4 | | | | |
| 5 | | | | |
| 6 | | | | |

ADD | DETAIL/EDIT | DELETE     606

CANCEL ~609    610~ OK

READING UNDERWAY

INSERT SHEET SETTING

| INTER LEAF | CHAPTER SHEET | INDEX SHEET |

| No. | SHEET | CASSETTE | INSERT POSITION | NUMBER OF SHEETS |
|---|---|---|---|---|
| 1 | INTER LEAF | CASSETTE 2  A4 | BEFORE 5TH PAGE | 1 |
| 2 | INTER LEAF | CASSETTE 2  A4 | BEFORE 9TH PAGE | 1 |
| 3 | INDEX SHEET | MANUAL FEED  A4 | BEFORE 14TH PAGE | 1 |
| 4 | | | | |
| 5 | | | | |
| 6 | | | | |

[ ADD ] [ DETAIL/EDIT ] [ DELETE ]

[ CANCEL ] — 609    610 — [ OK ]

FIG. 15

JOB COMBINATION: CONFIRMATION/PRINTING OF JOB BUNDLE

- NUMBER OF PRINT COPIES: 1 (1~9999)

| ✓ | TYPE | NAME | SHEET/CASSETTE | PAGES | DATE | TOTAL PAGES |
|---|---|---|---|---|---|---|
| 1 ✔ | COPY | 001 | CASSETTE 2  A4 | 4 | 2015/3/20 | 4 |
|  | INTER LEAF | | CASSETTE 2  A4 | BEFORE 5TH PAGE | | 5 |
| 2 ✔ | COPY | 001 | CASSETTE 2  A4 | 4 | 2015/3/20 | 9 |
|  | INTER LEAF | | CASSETTE 2  A4 | BEFORE 9TH PAGE | | 10 |
| 3 ✔ | COPY | 001 | CASSETTE 2  A4 | 5 | 2015/3/20 | 15 |
|  | INDEX SHEET | | MANUAL FEED  A4 | BEFORE 14TH PAGE | | 16 |

[ ] CANCEL SELECTION   [ FRONT COVER ]   [ INSERT SHEET ]

[ TEST PRINT ]   [ ADD FILE FROM BOX ]   [ ADD READ ORIGINAL ]

[ CANCEL JOB COMBINATION ]        [ START PRINTING ]

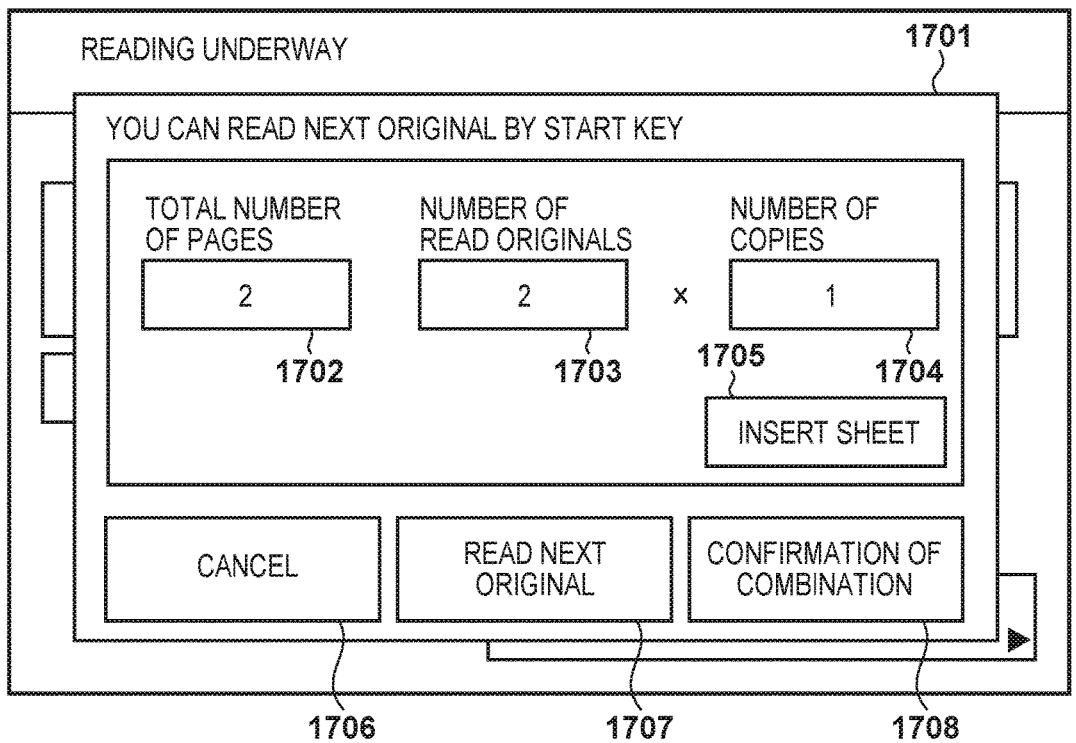

IMAGE FORMING APPARATUS THAT ACCEPTS A DESIGNATION OF AN INSERTION POSITION OF AN INSERTION SHEET AFTER OBTAINING IMAGE DATA OF A BUNDLE OF SHEETS, AND RELATED CONTROL METHOD AND STORAGE MEDIUM

This application claims the benefit of Japanese Patent Application No. 2015-105821, filed May 25, 2015, which is hereby incorporated by reference herein in its entirety.

BACKGROUND OF THE INVENTION

Field of the Invention

The present invention relates to an image forming apparatus, a method of controlling an image forming apparatus, and a storage medium.

Description of the Related Art

In recent years, reading originals comprised in a plurality of bundles bundle-by-bundle, combining image data of originals of each bundle, and outputting image data as a sequence of printed materials has been performed in an image forming apparatus. In such a case, it is possible to configure the image forming apparatus so as to set different modes or finishing methods for each bundle, and furthermore, to insert insertion sheets between the respective printed materials for each bundle. Furthermore, there is a method in which the above insert function of an insertion sheet can be used to designate what type of sheet to insert at what page of printed materials if, for example, inserting a colored paper between printed materials that have copied the first bundle and the second bundle, and inserting an index sheet between printed materials that have copied the second bundle and the third bundle is desired.

Japanese Patent Laid-Open No. 2010-134510 discloses a technique in which, in a program job function that combines printed material bundles generated by each job, a user operation is awaited after a printed material bundle is formed by a certain job, and a user can set processing (stapling) or separation (chapter sheet) for the bundle.

In conventional methods, however, first, counting the number of sheets of the printed material bundle, and storing the state of all pages of the bundle is performed, and then setting an insertion position of the insertion sheet or a type of the insertion sheet must be performed. Therefore, because a user needs to grasp the state of all pages and to set the type and an insertion position of the insertion sheet while envisioning an overall image of all printed material bundles, this invites a misoperation, and, if setting of an insertion sheet is in error, a resulting product will not be correctly obtained.

SUMMARY OF THE INVENTION

An object of the present invention is to eliminate the above-mentioned problems with conventional technology.

A feature of the present invention is to provide a technique that makes it simple to perform setting of a paper-sheet to be inserted between printed sheets.

According to a first aspect, the present invention provides an image forming apparatus comprising an obtaining unit configured to obtain image data of an original by reading the original and a number of read originals, an image forming unit configured to form an image on a sheet based on the image data of the original obtained by the obtaining unit, and a presentation unit configured, if designated to insert a paper-sheet into sheets each on which an image is formed by the image forming unit, to present an insertion position of the paper-sheet with respect to the sheets based on the number of sheets of the originals.

According to a second aspect, the present invention provides a method of controlling an image forming apparatus, the method comprising obtaining image data of an original by reading the original and a number of read originals, forming an image on a sheet based on the image data of the original obtained in the obtaining step, and, if designated to insert a paper-sheet into sheets each on which an image is formed in the forming step, presenting an insertion position of the paper-sheet with respect to the sheets based on the number of sheets of the originals.

Further features of the present invention will become apparent from the following description of exemplary embodiments with reference to the attached drawings.

BRIEF DESCRIPTION OF THE DRAWINGS

The accompanying drawings are incorporated in and constitute a part of the specification, illustrate embodiments of the invention, and, together with the description, serve to explain the principles of the invention.

FIG. 10 illustrates an example of a detailed insertion sheet setting screen that is displayed on the display unit of the image forming apparatus according to the first embodiment.

FIG. 11 illustrates an example of an insertion sheet setting screen that is displayed when the OK button in the detailed setting screen of the insertion sheet of FIG. 10 is pressed.

FIG. 14 illustrates an example of the insertion sheet setting screen that is displayed when the OK button in the detailed insertion sheet setting screen of FIG. 13 is pressed.

FIG. 15 illustrates an example of a screen for confirming a job combination setting and that is displayed on the display unit of the image forming apparatus according to the first embodiment.

FIG. 17 illustrates an example of a user operation screen at time of a sequential read that is displayed on a display unit of the image forming apparatus according to a second embodiment.

FIG. 18 illustrates an example of a screen for confirming job combination details at a time of sequential read that is displayed on a display unit of the image forming apparatus according to the second embodiment.

DESCRIPTION OF THE EMBODIMENTS

Embodiments of the present invention will be described hereafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

Figure 1:
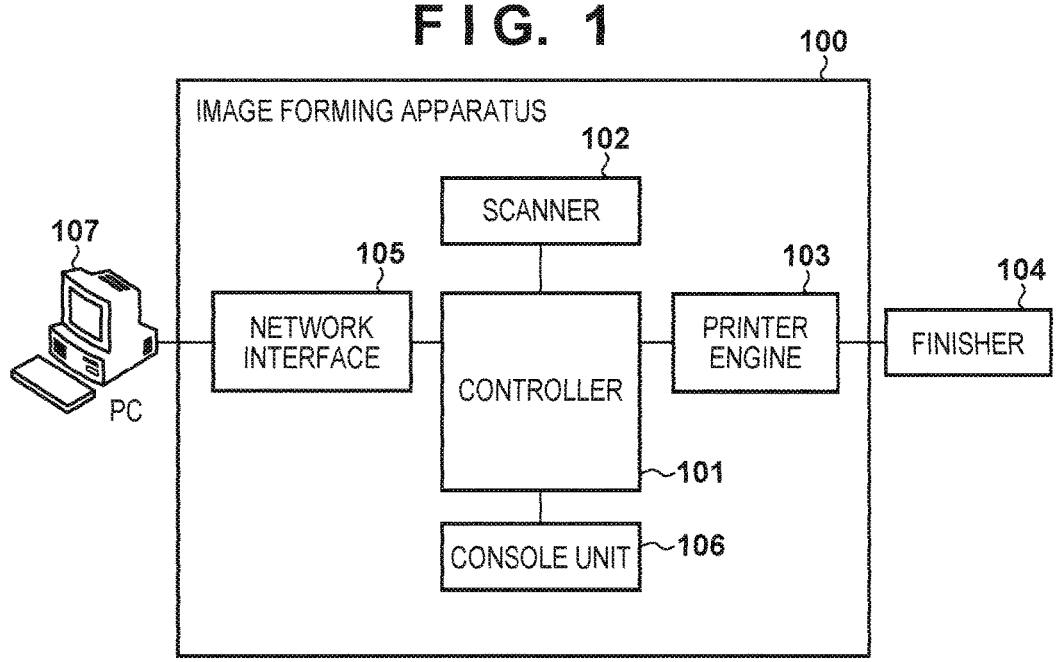
FIG. 1 depicts a view for explaining a configuration of a system that includes an image forming apparatus according to a first embodiment of the present invention.

FIG. 1 depicts a view for describing a configuration of a system that includes an image forming apparatus 100 according to a first embodiment of the present invention.

Figure 2:
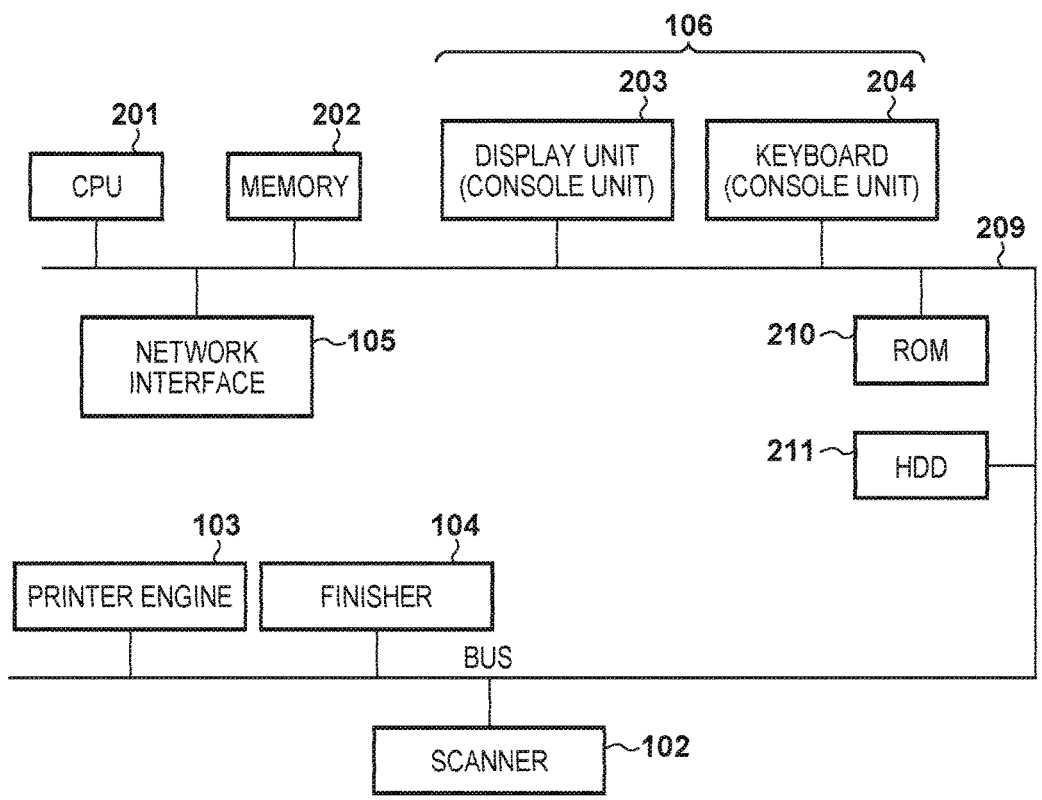
FIG. 2 is a block diagram for explaining a hardware configuration of a controller of the image forming apparatus according to the first embodiment.

A controller 101 controls operation of the image forming apparatus 100 according to the first embodiment, and has a hardware configuration that is illustrated in FIG. 2. The configuration of the controller 101 is explained later with reference to FIG. 2. A scanner 102 is controlled by the controller 101, reads an original, and outputs image data of an image of the original. A printer engine 103 prints an image on a sheet (paper) based on a print job received from a PC 107 or image data from the scanner 102. A console unit 106 has a keyboard 204 (FIG. 2), a display unit 203 (FIG. 2) that has a touch panel function, and the like, and, in addition to displaying information from the controller 101, the console unit 106 conveys to the controller 101 an operation instruction, by a user, that is input via the console unit 106. A network interface 105 provides bi-directional communication, via a network, between the image forming apparatus 100 and the PC 107.

A finisher 104 is connected to the printer engine 103, collects a plurality of sheets discharged from the printer engine 103, and performs bookbinding processing such as, for example, stapling processing, saddle stitching, or the like. Note that, although the finisher 104 is connected to an exterior of the image forming apparatus 100 here, it may be provided in the image forming apparatus 100. In addition, the finisher 104 is controlled by the controller 101 of the image forming apparatus 100.

FIG. 2 is a block diagram for explaining a hardware configuration of the controller 101 of the image forming apparatus 100 according to the first embodiment. Note that in FIG. 2, portions common to FIG. 1 are designated by the same reference numerals.

In the controller 101, a central processing unit (CPU) 201 is connected, via a bus 209, to a memory 202, the display unit 203, and the keyboard 204 comprised in the console unit 106, a read only memory (ROM) 210, and a hard disk drive (HDD) 211. The ROM 210 stores a boot program that is executed by the CPU 201, various kinds of settings data, and the like. Data and various programs that are executed by the CPU 201 are stored in the HDD 211, deployed into the memory 202 by the CPU 201 executing the boot program, and then executed by the CPU 201. The HDD 211 may be detachable from the image forming apparatus 100, or may be incorporated in the image forming apparatus 100. In addition, in place of the HDD 211, storage media, such as a universal serial bus (USB) memory medium, a secure digital (SD) card, or a solid-state drive (SSD), for example, may be used. Furthermore, the programs may be of a configuration in which they are downloaded via a network from another image forming apparatus, the PC 107, or the like, and then stored in the HDD 211.

By outputting of display data to the display unit 203 by a display control unit (not shown), the CPU 201 presents data to a user via the display unit 203, and, in addition the CPU 201, accepts a designation from a user by input of data from the keyboard 204 or the display unit 203, which has a touch panel function. In this way, information input from the console unit 106 is, under control of the CPU 201, transferred to either the memory 202 or the HDD 211 to be accumulated and used in various processing. Image data is input via the scanner 102 or the network interface 105, and, under control of the CPU 201, is saved in the HDD 211 or the memory 202. Image data stored in the HDD 211 can be moved or copied to the memory 202. Furthermore, in accordance with details designated from the console unit 106, various layout processing can be applied to image data of the memory 202.

Figure 3A:
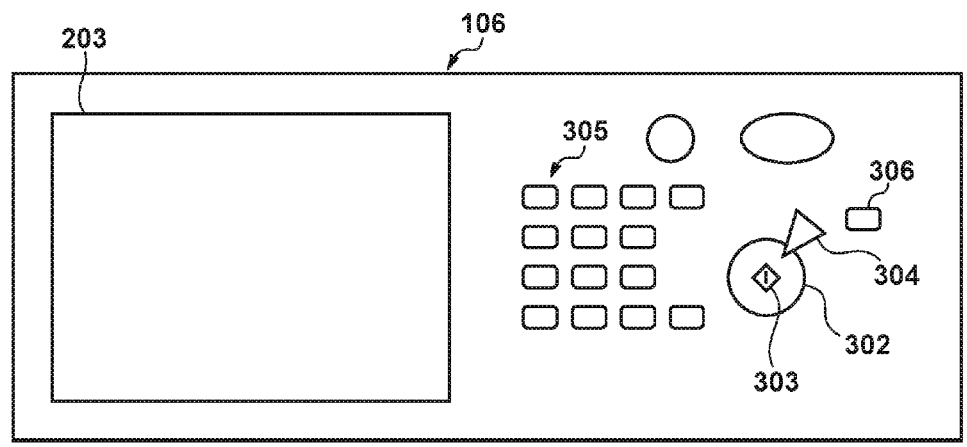
FIG. 3A depicts a top view of a console unit of the image forming apparatus according to the first embodiment.

FIG. 3A depicts a top view of the console unit 106 of the image forming apparatus 100 according to the first embodiment.

The display unit 203 functions as a touch panel in which a touch panel sheet is affixed onto a liquid crystal screen, for example, and in addition to displaying an operation screen of the system, softkeys, and the like, if a user touches a key, the display unit 203 conveys position information thereof to the CPU 201. A start key 302 is used when a user designates the start of a read operation of an original by the scanner 102, or the like. There is a green and red dual color light-emitting diode (LED) 303 in a central portion of the start key 302, and it indicates, by a light emission color thereof, whether the start key 302 is in a usable state. A stop key 304 is operated when a user stops an operation while the operation is being performed. A numeric keypad 305 has a group of buttons of numerals and text, and is used to set a number of copies or to designate switching a screen of the display unit 203. A user mode key 306 is pressed when a user performs a device setting. The keyboard 204 of FIG. 2 includes these hard keys 302 to 306, and the like.

Figure 3B:
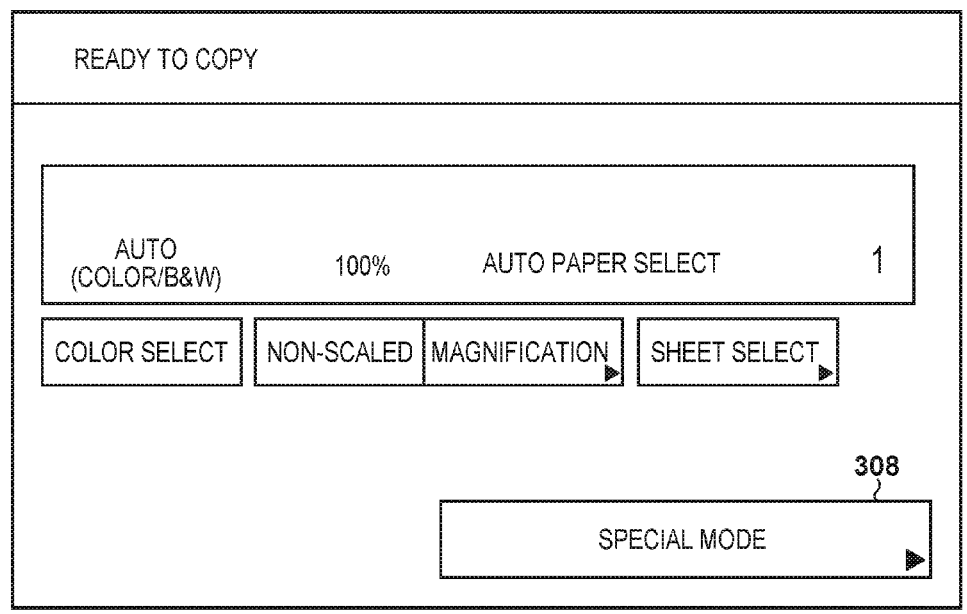
FIG. 3B illustrates an example of a copy initial screen displayed on a display unit of the image forming apparatus according to the first embodiment.

FIG. 3B illustrates an example of an initial screen for copying displayed on the display unit 203 of the image forming apparatus 100 according to the first embodiment.

From the initial screen for copying, a user can perform settings, such as magnification for copying, whether it is a color copy or a monochrome copy, selection of a paper-sheet cassette to use, and the like. In addition, a special mode button 308 for performing detailed setting is provided. If the special mode button 308 is pressed, the display unit 203 transitions to a special mode setting screen illustrated in FIG. 4.

Figure 4:
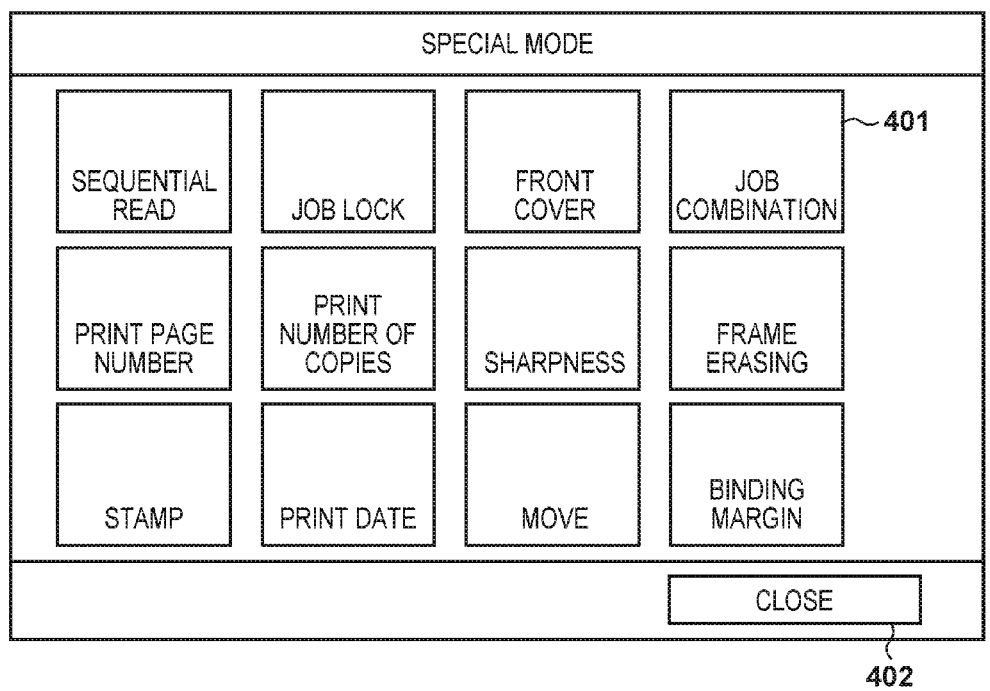
FIG. 4 illustrates an example of a special mode setting screen displayed on the display unit of the image forming apparatus according to the first embodiment.

FIG. 4 illustrates an example of a special mode setting screen displayed on the display unit 203 of the image forming apparatus 100 according to the first embodiment.

A button for each function is displayed on the special mode setting screen. A job combination function, which is a feature of the first embodiment, is set if a job combination button 401 is pressed. If a user presses the job combination button 401 on this screen, which causes its display to be inverted, and then presses a "close" button 402, the display unit 203 returns to the initial screen for copying illustrated on FIG. 3B. If a user presses the start key 302 in this state, reading of an original by the scanner 102 in the job combination mode is started.

Figure 5:
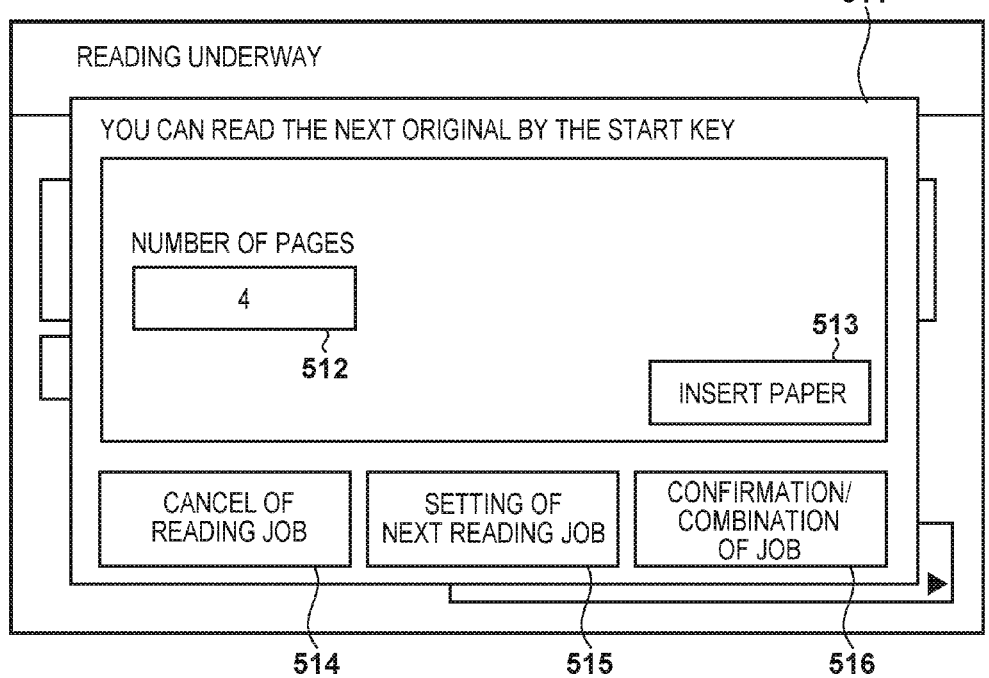
FIG. 5 illustrates an example of an interaction screen, displayed on the display unit of image forming apparatus according to the first embodiment that is displayed after one bundle of originals is read in a job combination mode.

FIG. 5 illustrates an example of a user operation screen that is displayed on the display unit 203 of the image forming apparatus 100 according to the first embodiment and that is displayed after one bundle of originals is read in the job combination mode.

A popup screen 511 displays a current state and various buttons. A "number of pages" 512 displays a number of pages of read originals. FIG. 5 illustrates a case in which a bundle of originals of 4 sheets has been read single-sidedly, and the number of pages is "4". Here, if a user presses an insertion sheet button 513, the display unit 203 transitions to an insertion sheet setting screen illustrated in FIG. 6. A "cancel of reading job" button 514 is used to cancel storage of image data of originals of bundles read in a reading job. If a "setting of next reading job" button 515 is pressed, the display unit 203 transitions to a screen for starting reading of a next bundle of originals. A "confirmation/combination of job" button 516 is a button for a user to confirm a result of originals combined in the job combination mode.

Figure 6:
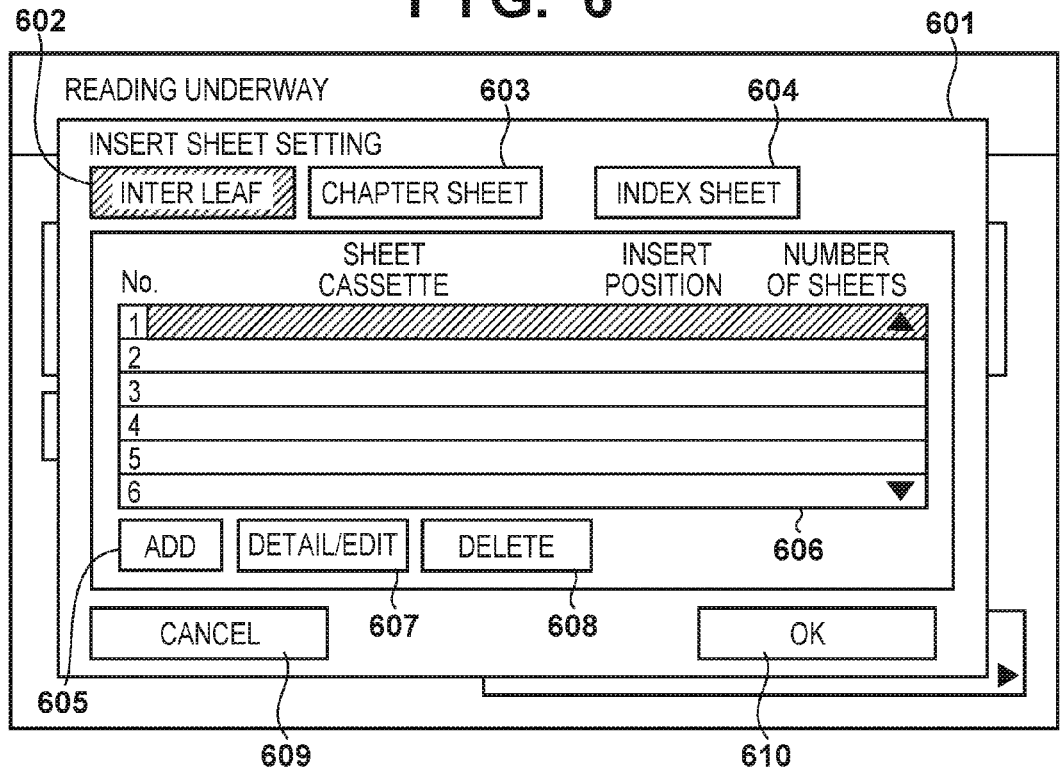
FIG. 6 illustrates an example of an insertion sheet setting screen that is displayed on the display unit of the image forming apparatus according to the first embodiment.

FIG. 6 illustrates an example of an insertion sheet setting screen displayed on the display unit 203 of the image forming apparatus 100 according to the first embodiment.

The insertion sheet setting screen is displayed as a popup screen 601, and the popup screen 601 includes buttons relating to setting of an insertion sheet. An inter leaf button 602, a chapter paper button 603, and an index paper button 604 are buttons for respectively selecting an inter leaf, a chapter sheet, and an index sheet as the insertion sheet. When a user selects one of these buttons and the selected button is displayed in an inverted state, the user presses an add button 605, the display unit 203 transitions to a detailed insertion sheet setting screen illustrated in FIG. 7. In other words, if the add button 605 is pressed in a state in which the type of the insertion sheet (inter leaf in FIG. 6) has been selected, the inter leaf is set as the insertion sheet, and the display unit 203 transitions to a setting screen for setting where to insert, from where to feed the inter leaf, and the like.

A list 606 shows a setting list of insertion sheets set at the current time. In FIG. 6, because this is the first setting of an insertion sheet, an insertion sheet is not displayed in the list 606. Details are explained later with reference to FIG. 8. A detail/edit button 607 and a delete button 608 are respectively used when displaying and editing, or deleting, detailed information of a setting selected from the list of insertion sheet settings that are displayed in the list 606. A cancel button 609 is a button for designating so as to cancel setting of an insertion sheet via this screen, and to return to the screen of FIG. 5. An OK button 610 is a button for designating so as to finalize setting of an insertion sheet via this screen.

Figure 7:
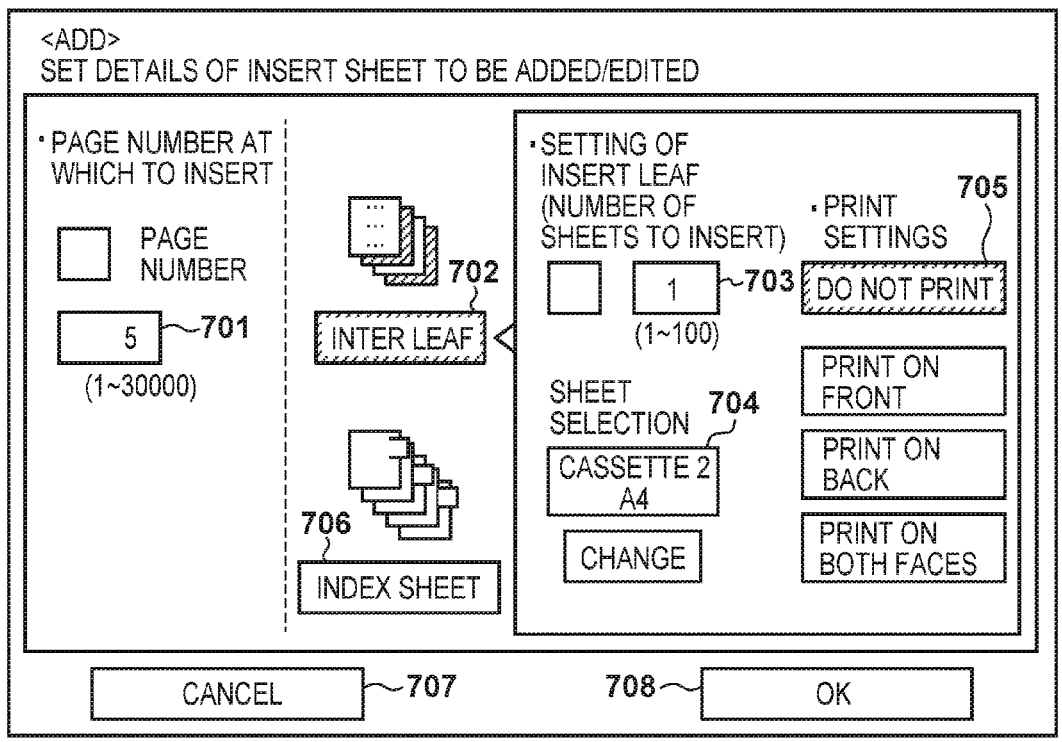
FIG. 7 illustrates an example of a detailed insertion sheet setting screen that is displayed on the display unit of the image forming apparatus according to the first embodiment.

FIG. 7 illustrates an example of a detailed insertion sheet setting screen displayed on the display unit 203 of the image forming apparatus 100 according to the first embodiment. This screen is displayed by the add button 605 being pressed on the screen of FIG. 6, described previously.

A field 701 displays a page number at which to insert the insertion sheet, or is an area in which the page number can be set. In FIG. 7, the number of pages "4" of the first bundle of originals explained with reference to FIG. 4 through FIG. 6 is stored, and a page number "5" that adds one page to the number is preset and displayed. Because of this, a user has no need to remember the number of pages of the read bundle of originals. The page number is arbitrarily changeable, and, for example, if there is a desire to input an insertion sheet directly before the last page of the first bundle of originals, by inputting "4" into the field 701, it is possible to set so as to insert the insertion sheet directly before the last page of the first bundle of originals.

A button 702 is a button for setting an inter leaf as an insertion sheet. A field 703 displays a number of sheets of inter leaf to insert. Here, one sheet is set. A button 704 is a button for selecting a paper-sheet cassette that is a feed source for feeding an inter leaf, which is the insertion sheet, and a button 705 is a button for setting whether to print on the insertion sheet. In FIG. 7, the inter leaf has been selected as the insertion sheet, and the inter leaf is an A4 size piece of paper-sheet fed from a cassette 2, and "do not print" the inter leaf is set. A button 706 is a button for setting an index sheet as the insertion sheet, and is explained later with reference to FIG. 13. A cancel button 707 is a button for cancelling an operation to add an insertion sheet via this screen. An OK button 708 is a button for finalizing an operation for setting an insertion sheet via this screen.

With such a configuration, FIG. 7 is displayed to allow a user to select, for example, an insertion position, a type, a number of sheets, and a feed source for an insertion sheet, print settings for the insertion sheet, and the like.

Figure 8:
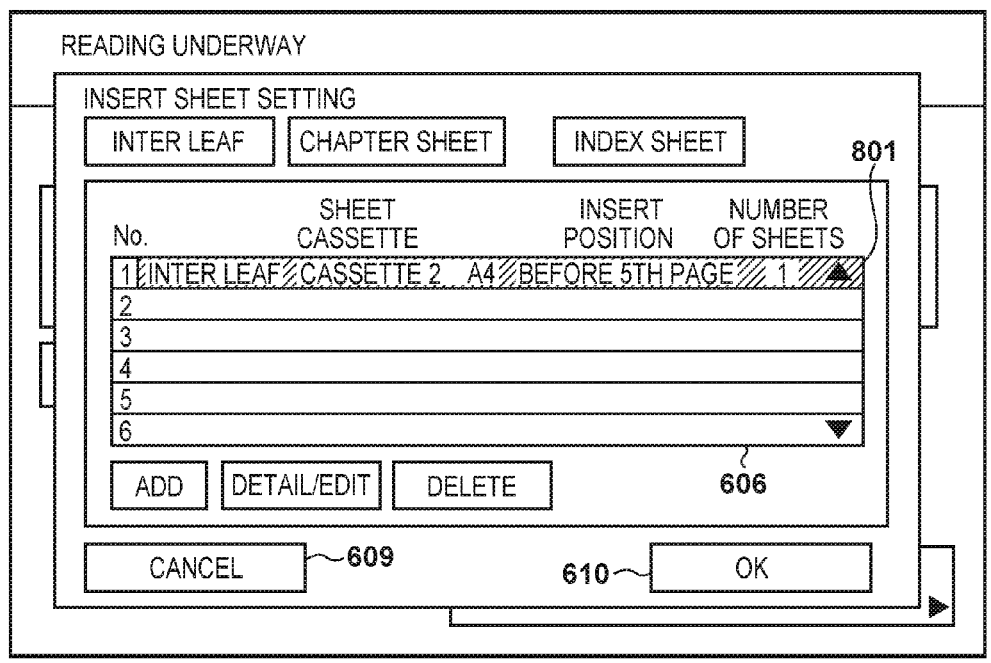
FIG. 8 illustrates an example of an insertion sheet setting screen that is displayed when an OK button in the detailed setting screen of the insertion sheet of FIG. 7 is pressed.

FIG. 8 illustrates an example of the insertion sheet setting screen displayed when the OK button 708 in the detailed setting screen of the insertion sheet of FIG. 7 is pressed. Here, portions in common with FIG. 6 are designated by the same reference numerals.

Here, a row 801 of the list 606 displays, as settings of a first insertion sheet, using an inter leaf, that the inter leaf is an A4 size paper-sheet fed from the cassette 2, that it is inserted immediately before the fifth page, and that its number of sheets is "1". The cancel button 609 is a button for designating so as to cancel setting of the insertion sheet in this screen. The OK button 610 is a button for ultimately finalizing the settings of the insertion sheet via this screen. If the OK button 610 is pressed, the display unit 203 returns to the screen of FIG. 5.

Thereafter, in the screen of FIG. 5, if the "setting of next reading job" button 515 is pressed, reading of the subsequent second bundle, for example, four pages of originals, is started. Thus, if the second bundle of originals has been read, a similar screen to the screen illustrated in FIG. 5 is displayed again. At this point, the field 512 displays "4", which is the number of pages of the second bundle of originals. If a user presses the insertion sheet button 513, for example, the display unit 203 displays a screen illustrated in FIG. 9.

Figure 9:
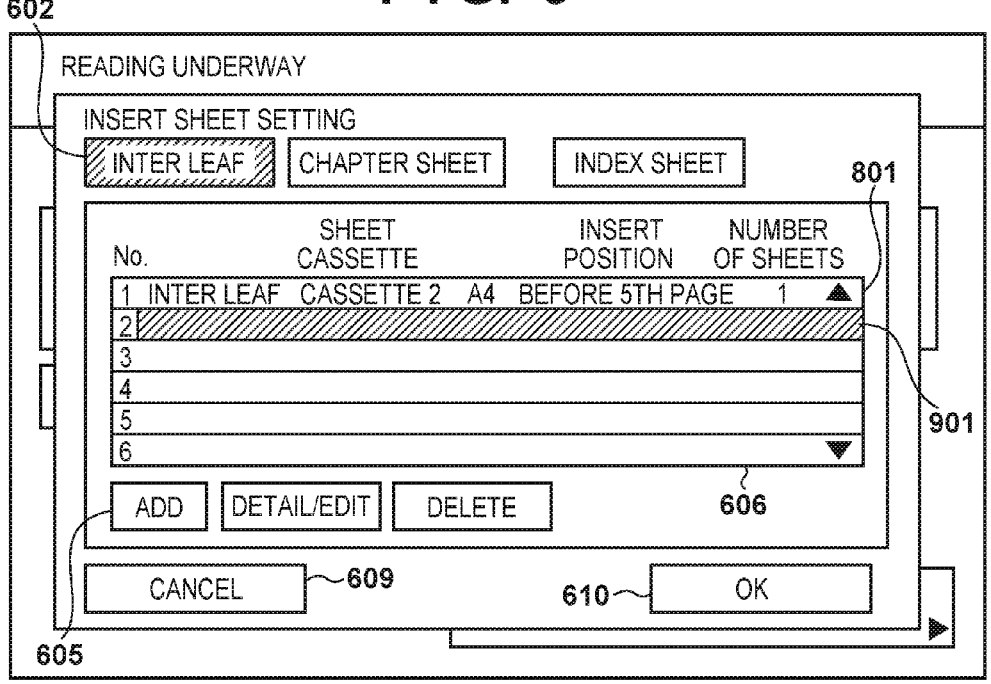
FIG. 9 illustrates an example of an insertion sheet setting screen that is displayed on the display unit of the image forming apparatus according to the first embodiment, after the second bundle of originals is read.

FIG. 9 illustrates an example of the insertion sheet setting screen that is displayed on the display unit 203 of the image forming apparatus 100 according to the first embodiment, and is displayed after the second bundle of originals has been read.

Although the screen of FIG. 9 is essentially the same as the screen of FIG. 6, described previously No. 1 of the list 606 displays settings of the first insertion sheet, described previously, and shown in FIG. 8, and as indicated by the reference numeral 901, No. 2 is in a state in which setting of the next insertion sheet is possible. Here, similarly to the description provided with respect to FIG. 6, if the inter leaf button 602 is pressed to select an inter leaf and the add button 605 is then pressed to designate addition of an inter leaf as an insertion sheet, the display unit 203 transitions to a screen, for example, as illustrated in FIG. 10.

FIG. 10 illustrates an example of a detailed insertion sheet setting screen displayed on the display unit 203 of the image forming apparatus 100 according to the first embodiment. This screen is displayed when, in the screen of FIG. 9, the add button 605 is pressed while the inter leaf button 602 is selected. Here, portions in common with FIG. 7 are designated in FIG. 10 by the same reference numerals.

Here, while the number of pages stored after reading originals is eight pages, which adds the four pages of the first bundle and the four pages of the second bundle, the insertion position of the insertion sheet is set to a page number "9" that adds one page, and that is displayed in the field 701. Because of this, a user has no need to remember the number of pages of the read bundle of originals. Because other settings are similar to those of FIG. 7, explanation thereof is omitted.

FIG. 11 illustrates an example of the insertion sheet setting screen displayed when the OK button 708 in the detailed setting screen of the insertion sheet of FIG. 10 is pressed. Here, portions in common with FIG. 8 are designated by the same reference numerals.

In FIG. 11, additionally from FIG. 8, a second interleave setting 1101 has been added in the list 606 at No. 2. If the OK button 610 is pressed, the display unit 203 returns to the screen of FIG. 5.

Thereafter, in the screen of FIG. 5, if the "setting of next reading job" button 515 is pressed, reading of the subsequent third bundle, for example, a bundle of originals of five pages, is started. Thus, if the third bundle of originals has been read, a similar screen to the screen illustrated in FIG. 5 is displayed. In this case, however, the field 512 displays "5", which is the number of pages of the third bundle of originals. If a user presses the insertion sheet button 513 thereafter, the display unit 203 displays an insertion sheet setting screen illustrated in FIG. 12, for example.

Figure 12:
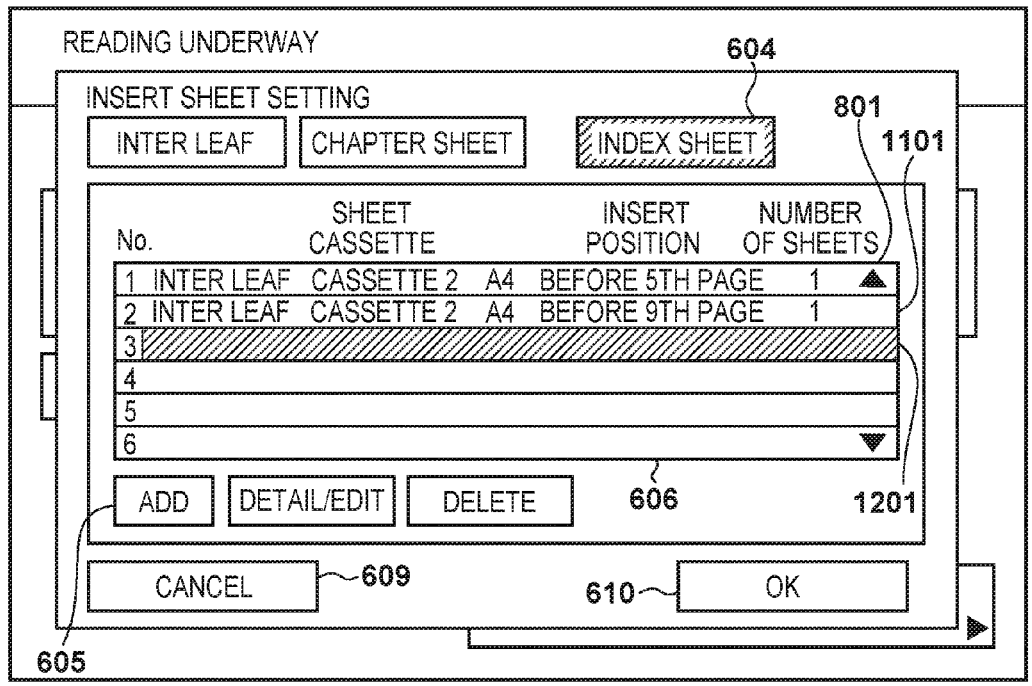
FIG. 12 illustrates an example of an insertion sheet setting screen that is displayed, by the image forming apparatus according to the first embodiment, when an insertion sheet button is pressed after a third bundle of originals is read.

FIG. 12 illustrates an example of an insertion sheet setting screen that is displayed, by the image forming apparatus 100 according to the first embodiment, when the insertion sheet button 513 in FIG. 5 is pressed after the third bundle of originals has been read. Here, portions in common with FIG. 11 are designated by the same reference numerals.

In FIG. 12, the index paper button 604 is inverted so as to indicate that it has been pressed and that an index sheet has been selected as an insertion sheet. In the list 606, a row 1201 for displaying information of a subsequent insertion sheet is inverted. If a user presses the add button 605, for example, the display unit 203 transitions to a screen illustrated in FIG. 13.

Figure 13:
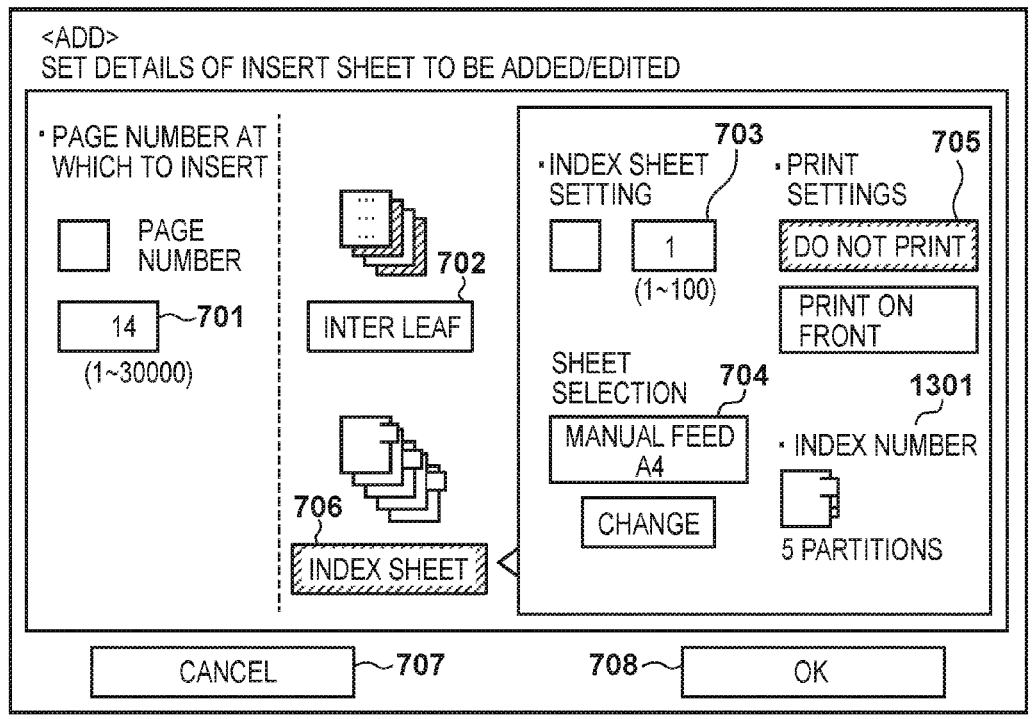
FIG. 13 illustrates an example of a detailed insertion sheet (index sheet) setting screen that is displayed on the display unit of the image forming apparatus according to the first embodiment.

FIG. 13 depicts a view that illustrates an example of a detailed insertion sheet (index sheet) setting screen displayed on the display unit 203 of the image forming apparatus 100 according to the first embodiment. This screen is displayed when, in the screen of FIG. 12, the add button 605 is pressed while the index paper button 604 is designated. Here, portions in common with FIG. 7 are designated in FIG. 13 by the same reference numerals.

The field 701 is a field in which a page number at which to insert the insertion sheet is displayed/can be set. Here, a page number "14" that adds one page to the total number of pages of the bundles of originals so far—thirteen pages, namely, the first bundle (four pages)+the second bundle (four pages)+the third bundle (five pages)—is displayed as a page number at which to insert the insertion sheet. With this, there ceases to be a need for a user to memorize a total of the number of pages of bundles of originals read thus far. The button 706 is a button for setting the insertion sheet to be an index sheet. The field 703 displays the number of index sheets to be inserted. The button 704 is a paper-sheet selection button, and is set to "A4 size index sheet of the manual feed tray" here. The button 705 is a button for setting whether to print on the index sheet, which is an insertion sheet. Here, the button 705 is set to "do not print". An index number 1301 illustrates the number of partitions of tabs of the index sheet, and, here, the index number 1301 it is set to five partitions. The cancel button 707 is a button for cancelling an operation to add the insertion sheet via this screen, and the OK button 708 is a button for finalizing the setting of the insertion sheet via this screen. If the OK button 708 in the screen of FIG. 13 is pressed, the display unit 203 transitions to a screen of FIG. 14.

FIG. 14 illustrates an example of the insertion sheet setting screen displayed when the OK button 708 in the detailed setting screen of the insertion sheet of FIG. 13 is pressed. Here, portions in common with FIG. 11 are designated by the same reference numerals.

In FIG. 14, similarly to the case of FIG. 8 and FIG. 11, setting of an index sheet as the third insertion sheet has been performed to No. 3 row 1401 in the list 606. Here, from FIG. 14, it can be understood that the insertion sheet is an "index sheet", the paper-sheet cassette is "A4 size manual feed tray", and the insertion position is before the fourteenth page.

If a user pressed the OK button 610 in this screen, the display unit 203 returns to the interaction screen illustrated in FIG. 5 is. In the screen of FIG. 5, if a user presses the "confirmation/combination of job" button 516, the display unit 203 transitions to a screen illustrated in FIG. 15, for example.

FIG. 15 illustrates an example of a screen for confirming a job combination setting and that is displayed on the display unit 203 of the image forming apparatus 100 according to the first embodiment.

A list 1501 is a list screen for showing a result of combining job bundles. A field 1502 is a field for setting a number of print copies. An area 1503 is a display region for confirming job combining settings. Here, it is possible to select or to release all of the items of the list 1501 by a selection cancellation button 1506 or by tapping rows of the list 1501, by adding or removing a check to an item of the list 1501, it is possible to select whether to set the item as a target of job combination. A number of pages display 1504 displays the number of pages corresponding to the items of the list 1501. In a case of copying, this records a total number of pages of a read in bundle of originals, and in a case of an insertion sheet (an inter leaf, an index sheet), this records a page number at which to insert the insertion sheet. Total pages 1505 displays a total number of pages, and displays a cumulative number of pages that includes insertion sheets from the first bundle of originals.

In FIG. 15, for the first copy "001", the initial four sheets of originals are copied, then an inter leaf of one sheet is inserted. In the next copy "001", four sheets of originals of the second bundle are copied, and then an inter leaf of one sheet is inserted. Furthermore, it can be seen that in the subsequent third copy "001", five sheets of originals are copied, and then, an index sheet is inserted, and printed materials of a total of sixteen sheets is completed.

Here, if a desired row of the list 1501 is selected and then a selection cancel button 1506 is pressed, it is possible to exclude a copy or an insertion sheet indicated by that row from the job combination. In addition, by pressing a front cover button 1508, it is possible to newly add a front cover to the job combination. In addition, by pressing an insertion sheet button 1509, it is possible to add another insertion sheet.

A test print button 1507 is a button for designating a test print for confirming a print result for this job combination. The front cover button 1508 and the insertion sheet button 1509 are buttons for setting a front cover and an insertion sheet, respectively. In addition, an "add file from box" button 1510 and an "add read original" button 1511 are buttons for respectively designating so as to add a bundle of originals from a box or by reading an original by the scanner 102. A "cancel job combination" button 1512 is a button for cancelling all operations for job combination, and a "start printing" button 1513 is a button for designating so as to start printing in accordance with these settings.

With such a configuration, by displaying in a list a finishing of printed materials according to a job combination, there are the effects that a user can grasp a job combination result (finished), and it is possible to improve convenience and visibility for the user.

Figure 16:
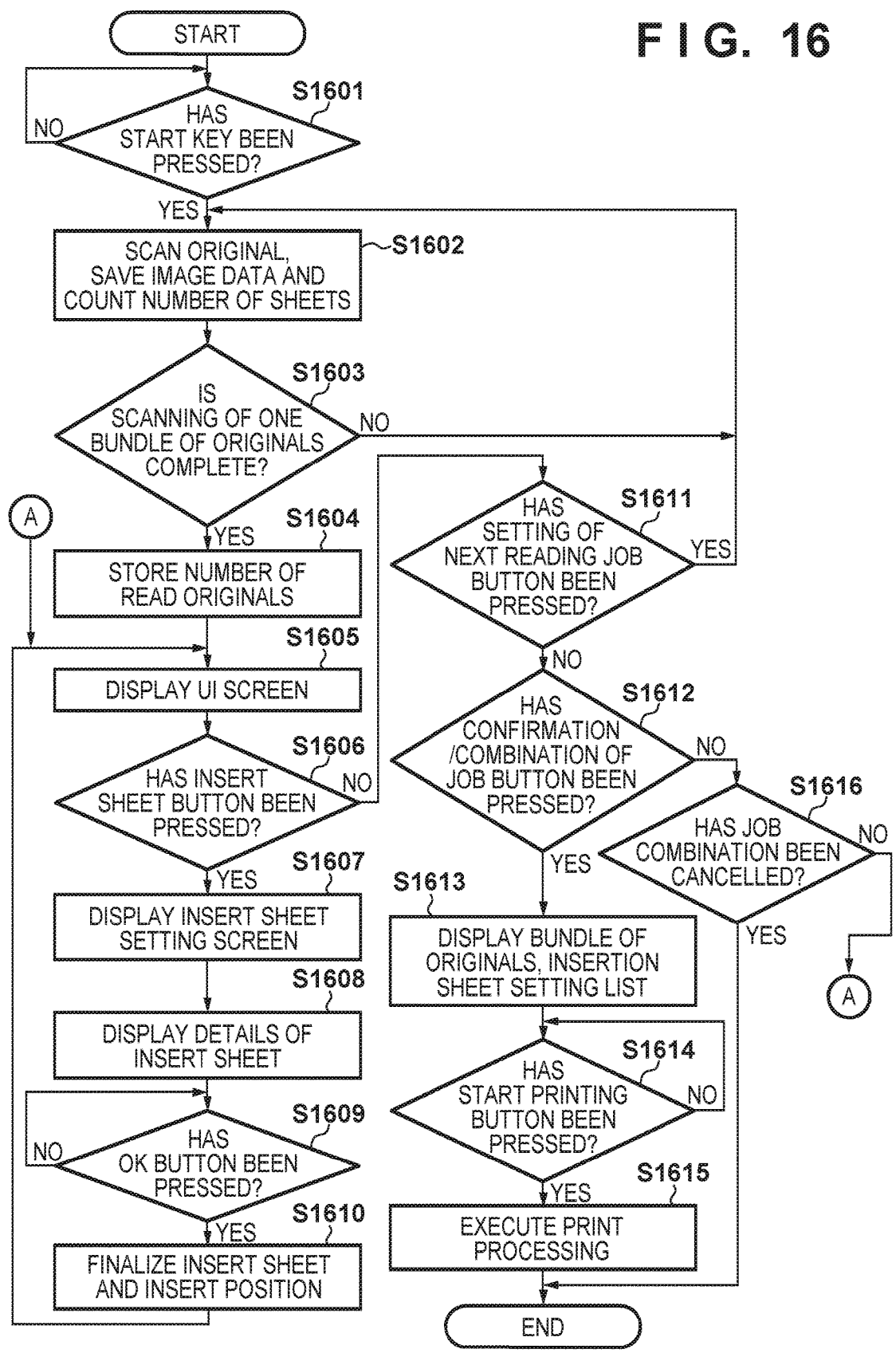
FIG. 16 is a flowchart for describing processing to set and to confirm an insertion sheet in a job combination mode by the image forming apparatus according to the first embodiment.

FIG. 16 is a flowchart for describing processing to set and to confirm an insertion sheet in the job combination mode by the image forming apparatus 100 according to the first embodiment. Note that a program for executing this processing is stored in the HDD 211, and, by deploying the program into the memory 202 at a time of execution, and executing the program under the control of the CPU 201, processing illustrated by this flowchart is achieved.

For this processing, if the special mode button 308 is pressed in a state in which an initial screen for copying, such as the screen shown in FIG. 3B, for example, is displayed, the special mode setting screen of FIG. 4 is displayed. By selecting the job combination button 401 in this screen and then pressing the "close" button 402, the processing is started.

First, in step S1601, the CPU 201 waits for the start key 302 of the console unit 106 to be pressed. If the start key 302 is pressed, the processing proceeds to step S1602 and the CPU 201 controls the scanner 102 to start reading of originals. In addition to reading originals by the scanner 102, obtaining resulting image data of the originals, and storing the image data in the HDD 211, a number of sheets (a number of pages) of the originals is obtained by counting the sheets. Step S1602 and step S1603 are repeatedly executed until reading of a first plurality of originals (a bundle of originals) is completed in step S1603. If reading of the bundle of originals completes in step S1603, the processing proceeds to step S1604, and the CPU 201 stores the counted number of sheets of originals in the memory 202. Note that, in order to simplify the explanation, explanation is given of an example in which one side of originals is read. Accordingly, a number of pages of read originals and a number of read originals match.

Next, the processing proceeds to step S1605, and the CPU 201 displays an operation screen, such as the screen shown in FIG. 5, for example. Next, the processing proceeds to step S1606, and the CPU 201 determines whether or not the insertion sheet button 513 has been pressed in the screen of FIG. 5. If the CPU 201 determines that the insertion sheet button 513 has been pressed in step S1606, the processing proceeds to step S1607, otherwise the processing proceeds to step S1611. In step S1607, the CPU 201 displays on the display unit 203 an insertion sheet setting screen, such as the screen shown in FIG. 6, for example. If a user, via the screen of FIG. 6, selects an insertion sheet type and then presses the add button 605, the processing proceeds to step S1608, the CPU 201 displays a screen, such as the screen shown in FIG. 7, for example, and the type of the insertion sheet designated by a user, an insertion position thereof, and the like, are displayed on the screen. Next the processing proceeds to step S1609, and the CPU 201 determines whether or not the OK button 708 in the screen of FIG. 7 has been pressed. If the CPU 201 determines that the OK button 708 has been pressed, the processing proceeds to step S1610. In step S1610, the CPU 201 finalizes the insertion position, the type, the number of sheets, and the like of the insertion sheet set via the screen of FIG. 7, the processing proceeds to step S1605, and an interaction screen such as that illustrated in FIG. 5 is displayed again.

If the CPU 201 determines in step S1606 that the insertion sheet button 513 is not pressed in the screen of FIG. 5, the processing proceeds to step S1611, and the CPU 201 determines whether or not the "setting of next reading job" button 515 has been pressed. If it is determined that the "setting of next reading job" button 515 has been pressed, the processing proceeds to step S1602, the scanner 102 is controlled to execute processing for reading the next bundle of originals, and processing similar to when reading the first bundle of originals, as described previously, is executed.

Meanwhile, if it is determined that the "setting of next reading job" button 515 has not been pressed in step S1611, the processing proceeds to step S1612, and the CPU 201 determines whether or not the "confirmation/combination of job" button 516 has been pressed in the screen of FIG. 5. If it is determined that the "confirmation/combination of job" button 516 has been pressed, the processing proceeds to step S1613, and the CPU 201 displays a job combination confirmation/print screen, such as the screen shown in FIG. 15, for example. The processing proceeds to step S1614, and the CPU 201 determines whether or not the "start printing" button 1513 has been pressed in this screen. If the CPU 201 determines that the "start printing" button 1513 has been pressed, the processing proceeds to step S1615, and the CPU 201 executes print processing for bundles of originals read so far.

If the CPU 201 determines that the "confirmation/combination of job" button 516 of the screen of FIG. 5 is not pressed in step S1612, the processing proceeds to step S1616, and the CPU 201 determines whether or not the "cancel of reading job" button 514 has been pressed. If the CPU 201 determines that the "cancel of reading job" button 514 has not been pressed, the processing proceeds to step S1605, but if the CPU 201 determines that the "cancel of reading job" button 514 has been pressed, settings so far are discarded, and this processing is terminated.

By the first embodiment, as explained above, if performing copy processing that reads a plurality of bundles of originals, and combines and prints images of the read plurality of bundles of originals, it is possible to select a type of an insertion sheet to insert between printed materials, and to insert the insertion sheet at a desired position in printed materials. In such a case, it is also possible to designate from which feed cassette to feed the insertion sheet.

In addition, because a position at which to insert the insertion sheet is automatically calculated based on the number of read originals and is displayed, a user can easily set and confirm the insertion position of the insertion sheet without being concerned by the number of sheets of each read bundle of originals.

Also, because addition or deletion of an insertion sheet can be easily designated from the insertion sheet setting screen, there is an effect in that it is convenient for a user.

[Second Embodiment]

Next, explanation will be given for the second embodiment of the present invention. In the second embodiment, explanation is given of an example of setting an insertion sheet in a sequential read mode instead of a job combination as in the first embodiment. Note that a configuration of the image forming apparatus according to the second embodiment is essentially the same as that of the first embodiment, and, because screen configuration only partially differs, an explanation is only given of differences. Here, when reading originals by setting the originals one sheet at a time on an original platen (a pressing plate) without using an automatic document feeder (ADF), for example, a sequential read mode is used, such as when it is desired that each of those sheets be collected into one document. This is, for example, used in a case in which it is desired to employ, with respect to a plurality of types of paper-sheets having different original sizes, both reading of originals by ADF and a method of setting originals one sheet at a time in a pressing plate to read the originals, and to collect the originals thus read as a single document.

FIG. 17 illustrates an example of an interaction screen during a sequential read that is displayed on the display unit 203 of the image forming apparatus 100 according to the second embodiment. This screen corresponds to the interaction screen of FIG. 5 for the case of job combination in accordance with the first embodiment described previously.

In a popup screen 1701, a total number of pages 1702, a number of read originals 1703, and a number of copies 1704 are displayed. This screen illustrates an example in which two originals have been read single-sidedly, and illustrates a state in which reading of two pages for the two originals has completed. Here, if an insertion sheet button 1705 is pressed, the display unit 203 advances to a screen for setting an insertion sheet. This insertion sheet setting screen is similar to the screen, as shown in FIG. 6 through FIG. 8, for example, described previously with respect to first embodiment. Via the insertion sheet setting screen, setting of an insertion sheet that uses an inter leaf, an index sheet, or the like, as an insertion sheet is performed. A cancel button 1706 is a button for cancelling reading of an original. A "read next original" button 1707 is a button for instructing to start processing for reading a next original. If a confirmation of combination button 1708 is pressed, transition is made to a confirmation screen, such as the screen shown in FIG. 18, for example.

FIG. 18 illustrates an example of a screen for confirming job combination details at a time of a sequential read that is displayed on the display unit 203 of the image forming apparatus 100 according to the second embodiment. Because this screen is common to the screen described previously with respect to FIG. 15, an explanation is omitted.

In FIG. 18, the insertion sheet is set so that, after copying that reads two originals, one sheet of inter leaf is inserted after the two sheets of printed materials, and then copying of four originals is executed.

Figure 19:
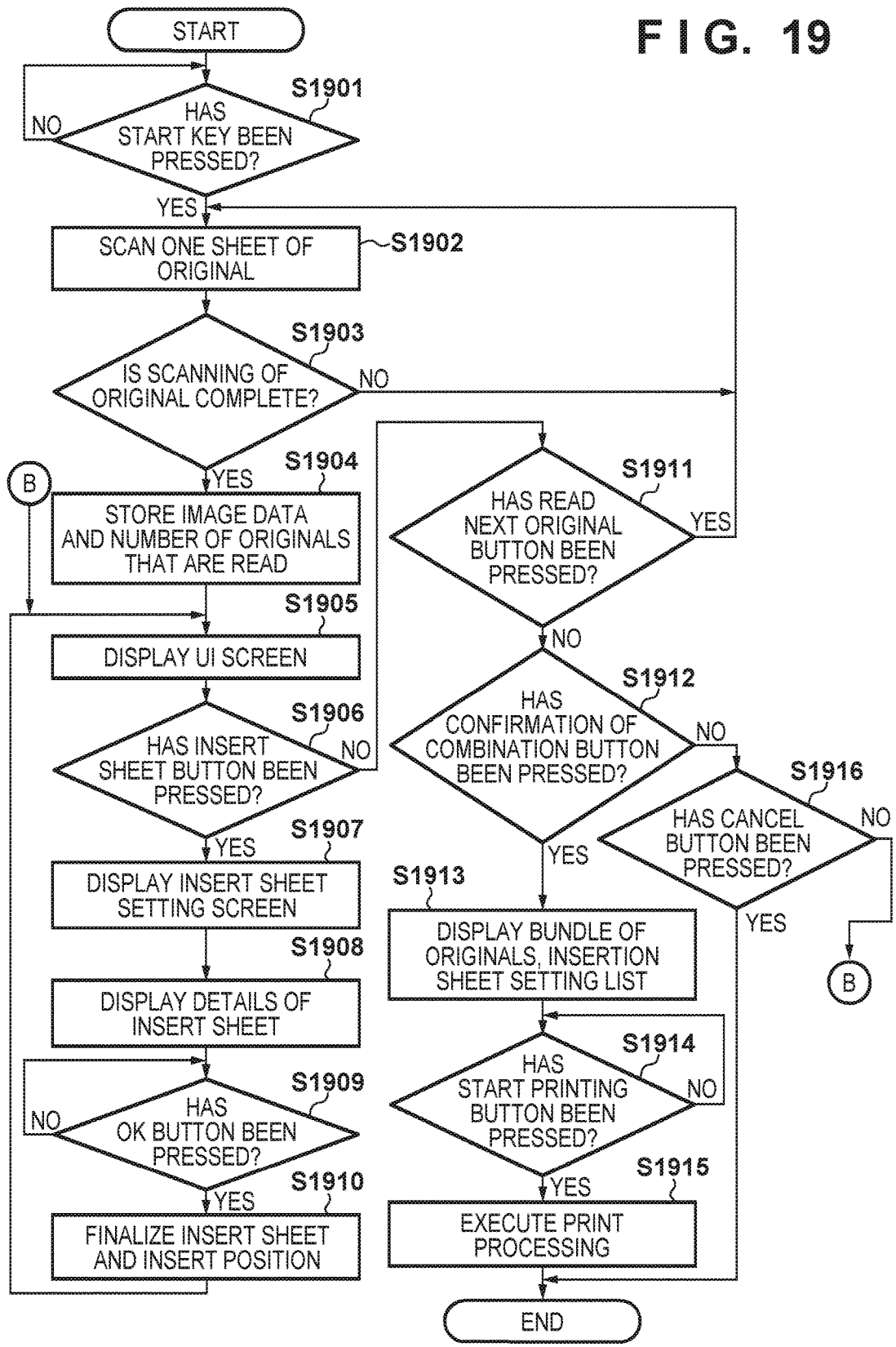
FIG. 19 is a flowchart for describing processing to set and to confirm an insertion sheet in a job combination in sequential read mode by the image forming apparatus according to the second embodiment.

FIG. 19 is a flowchart for describing processing to set and to confirm an insertion sheet in a job combination in sequential read mode by the image forming apparatus 100 according to the second embodiment. Note that a program for executing this processing is stored in the HDD 211, and by deploying the program into the memory 202 at a time of execution, and executing the program under the control of the CPU 201, processing illustrated by this flowchart is achieved.

For this processing, if the special mode button 308 is pressed in a state in which an initial screen for copying, such as the screen shown in FIG. 3B, for example, is displayed, the special mode setting screen of FIG. 4 is displayed. By selecting the job combination button 401 in this screen and then pressing the "close" button 402, the processing is started.

In step S1901, if the start key 302 is pressed the processing proceeds to step S1902. In step S1902, the CPU 201 causes the scanner 102 to read one original. When the reading of one original is finished in step S1903, the processing proceeds to step S1904, and the CPU 201 stores the image data and the number of sheets that are read in the HDD 211. Next the processing proceeds to step S1905, and the CPU 201 displays on the display unit 203 an operation screen such as that illustrated in FIG. 17, for example. Next the processing proceeds to step S1906, and the CPU 201 determines whether or not the insertion sheet button 1705 has been pressed. If the CPU 201 determines that the insertion sheet button 1705 has been pressed, the processing proceeds to step S1907, and the display unit 203 displays an insertion sheet setting screen, such as the screen illustrated in one of FIG. 6 and FIG. 7, described previously, for example. Because processing of step S1907 through step S1910 is the same as the processing of the step S1607 through step S1610 of FIG. 16, described previously, an explanation thereof is omitted.

If the CPU 201 determines that the insertion sheet button 1705 is not pressed in step S1906, the processing proceeds to step S1911, and the CPU 201 determines whether or not the "read next original" button 1707 of FIG. 17 has been pressed. Here, if it is determined that the "read next original" button 1707 has been pressed, the processing proceeds to step S1902, and processing for reading the next original is executed. If the CPU 201 determines that the "read next original" button 1707 has not been pressed, however, the processing proceeds to step S1912, and the CPU 201 determines whether or not the "confirmation of combination" button 1708 of FIG. 17 has been pressed. If the CPU 201 determines that the "confirmation of combination" button 1708 has been pressed, the processing proceeds to step S1913, and the CPU 201 displays a screen for confirming a result of a job combination, such as the screen shown in FIG. 15, for example. Because processing of step S1913 through step S1915 is the same as the processing of the step S1613 through step S1615 of FIG. 16, described previously, an explanation thereof is omitted.

If the CPU 201 determines that the "confirmation of combination" button 1708 is not pressed in step S1912, the processing proceeds to step S1916, and the CPU 201 determines whether or not the "cancel" button 1706 of FIG. 17 has been pressed. If the CPU 201 determines that the "cancel" button 1706 has been pressed, the job is cancelled, and the processing terminates. If the "cancel" button 1706 is not pressed, the processing proceeds to step S1905.

By the second embodiment, as explained above, if performing copy processing that reads originals one sheet at a time, and combines and prints images of the read originals, it is possible to select a type of an insertion sheet to insert between printed materials, and to insert the insertion sheet at a desired position in printed materials. In such a case, it is also possible to designate from which feed cassette to feed the insertion sheet.

In addition, because a position at which to insert the insertion sheet is automatically calculated based on the number of read originals and is displayed, a user can easily set and confirm the insertion position of the insertion sheet without being concerned by the number of sheets of each read bundle of originals.

Also, because addition or deletion of an insertion sheet can be easily designated from the insertion sheet setting screen, there is an effect in that it is convenient for a user.

Other Embodiments

Embodiments of the present invention can also be realized by a computer of a system or an apparatus that reads out and executes computer executable instructions (e.g., one or more programs) recorded on a storage medium (that may also be referred to more fully as a 'non-transitory computer-readable storage medium') to perform the functions of one or more of the above-described embodiments and/or that includes one or more circuits (e.g., an application specific integrated circuit (ASIC)) for performing the functions of one or more of the above-described embodiments, and by a method performed by the computer of the system or the apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., a central processing unit (CPU), or a micro processing unit (MPU)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image forming apparatus comprising:
   a display;
   a printer;
   a scanner that reads originals to obtain (1) image data of the originals, and (2) a number of the read originals;
   a memory device that stores a set of instructions; and
   at least one processor that executes the instructions:
   (i) to cause the scanner to read a first bundle of originals to obtain first image data of the first bundle of originals and a number of the originals of the first bundle according to an instruction from a user;
   (ii) to cause the display to display, before reading a second bundle of originals, a first screen including an item for accepting a designation, by the user, of an insertion position of an insertion sheet, and, if a designation for insertion of the insertion sheet has been made, after the scanner has obtained the first image data of the first bundle of originals, the item includes an initial destination of the insertion position that is determined by adding one to the number of the originals of the first bundle that have been read by the scanner;
   (iii) to cause the display to display a second screen including at least the insertion position of the insertion sheet in accordance with receiving the designation on the item by the user via the first screen;
   (iv) to cause the scanner to read the second bundle of originals to obtain second image data of the second bundle of originals and a number of the originals of the second bundle according to the instruction from the user;
   (v) to cause the display to display a list of information of the first bundle, the insertion sheet, and the second bundle, after reading the second bundle of originals; and
   (vi) to cause the printer to print the first image data on a first set of sheets to discharge the first set of sheets, to insert the insertion sheet after the discharged first set of sheets, and to print the second image data on a second set of sheets to discharge the second set of sheets after the insertion sheet, in accordance with a print instruction received via the display of the list.

2. The image forming apparatus according to claim 1, wherein, based on a job including a designation for copying the originals, the at least one processor executes the instructions in the memory device to cause the scanner to read the originals to obtain (1) the image data of the originals, and (2) the number of the read originals.

3. The image forming apparatus according to claim 1, wherein the first screen further includes items for respectively accepting a designation, by the user, of (1) a type of the insertion sheet, (2) a number of insertion sheets to be inserted, and (3) a feed source of the insertion sheet.

4. The image forming apparatus according to claim 1, wherein the at least one processor further executes the instructions in the memory device:
   (vii) to designate a combination of a plurality of jobs, each of which designates copying a bundle of originals;
   (viii) to display, on the display, a third screen including a list in which the information related to the insertion sheet and information of each of the plurality of jobs are arranged in an order of the plurality of jobs, when the combination of the plurality of jobs is designated; and
   (ix) to edit the list displayed on the display.

5. The image forming apparatus according to claim 4, wherein the information of each of the plurality of jobs includes a number of originals to be read by the scanner for each of the plurality of jobs.

6. A method of controlling an image forming apparatus having a scanner, a printer, and a display, the method comprising:
   causing the scanner to read a first bundle of originals to obtain (1) first image data of the first bundle of originals, and (2) a number of the originals of the first bundle according to an instruction from a user;

causing the display to display, before reading a second bundle of originals, a first screen including an item for accepting a designation, by the user, of an insertion position of an insertion sheet, and, if a designation for insertion of the insertion sheet has been made, after the scanner has obtained the first image data of the first bundle of originals, the item includes an initial destination of the insertion position that is determined by adding one to the number of the originals of the first bundle that have been read by the scanner;

causing the display to display a second screen including at least the insertion position of the insertion sheet in accordance with receiving the designation on the item by the user via the first screen;

causing the scanner to read the second bundle of originals to obtain second image data of the second bundle of originals and a number of the originals of the second bundle according to the instruction from the user;

causing the display to display a list of information of the first bundle, the insertion sheet, and the second bundle, after reading the second bundle of originals; and causing the printer to print the first image data on a first set of sheets to discharge the first set of sheets, to insert the insertion sheet after the discharged first set of sheets, and to print the second image data on a second set of sheets to discharge the second set of sheets after the insertion sheet, in accordance with a print instruction via the display of the list.

7. A non-transitory computer readable storage medium storing a program for causing a processor to execute a method of controlling an image forming apparatus having a scanner, a printer, and a display, the method comprising:

causing the scanner to read a first bundle of originals to obtain (1) first image data of the first bundle of originals, and (2) a number of the originals of the first bundle according to an instruction from a user;

causing the display to display, before reading of a second bundle of originals, a first screen including an item for accepting a designation, by the user, of an insertion position of an insertion sheet, and, if a designation for insertion of the insertion sheet has been made, after the scanner has obtained the first image data of the first bundle of originals, the item includes an initial destination of the insertion position that is determined by adding one to the number of the originals of the first bundle that have been read by the scanner;

causing the display to display a second screen including at least the insertion position of the insertion sheet in accordance with receiving the designation on the item by the user via the first screen;

causing the scanner to read the second bundle of originals to obtain second image data of the second bundle of originals and a number of the originals of the second bundle according to the instruction from the user;

causing the display to display a list of information of the first bundle, the insertion sheet, and the second bundle, after reading the second bundle of originals; and causing the printer to print the first image data on a first set of sheets to discharge the first set of sheets, to insert the insertion sheet after the discharged first set of sheets, and to print the second image data on a second set of sheets to discharge the second set of sheets after the insertion sheet, in accordance with a print instruction via the display of the list.

* * * * *